April 5, 1932.  R. F. BACON  1,852,637
RECOVERY OF SULPHUR FROM ROASTER GASES
Filed May 9, 1927
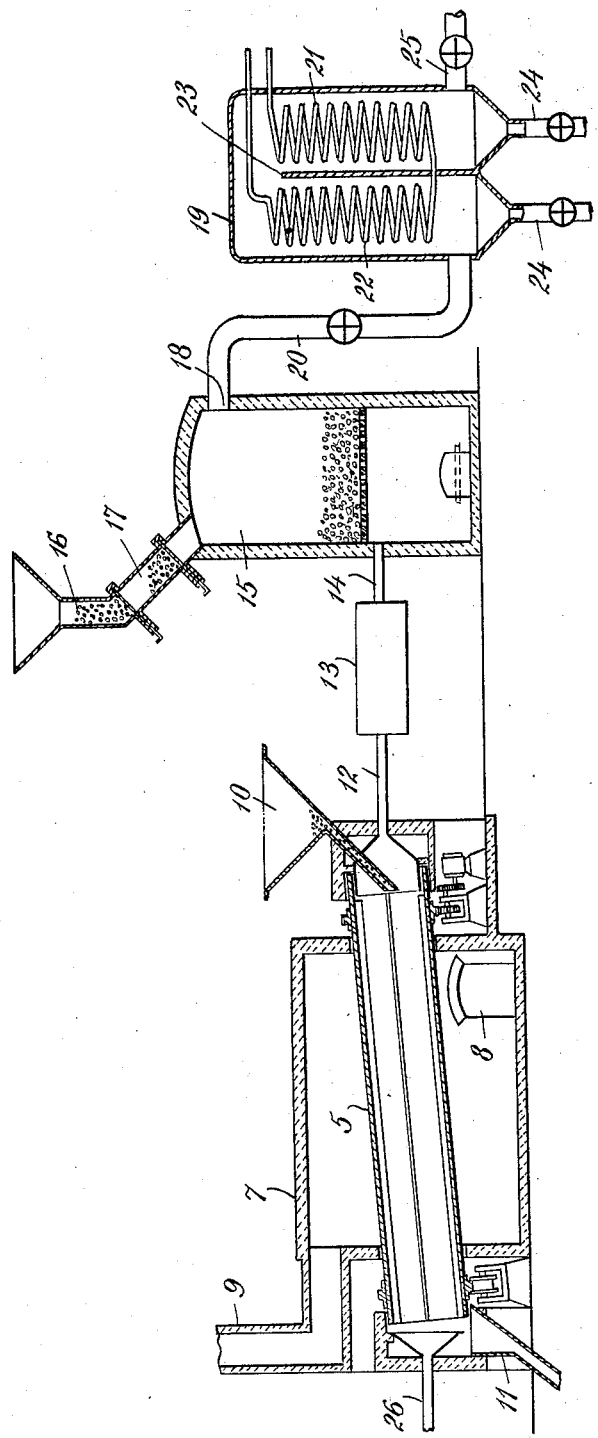
INVENTOR
Raymond F. Bacon
BY
Rennie, Davis, Marvin and Edmonds
HIS ATTORNEYS Patented Apr. 5, 1932

1,852,637

UNITED STATES PATENT OFFICE

RAYMOND F. BACON, OF BRONXVILLE, NEW YORK

RECOVERY OF SULPHUR FROM ROASTER GASES

Application filed May 9, 1927. Serial No. 189,841.

This invention relates to the treatment of sulphur-bearing material, such as mineral sulphide ores, for the recovery of sulphur, and has for its object the provision of an improved method of recovering sulphur in elemental form from roaster gases. More particularly, the invention aims to provide an improved method of an apparatus for recovering elemental sulphur from roaster gases by the enrichment of the roaster gases in sulphur dioxide.

Sulphur dioxide may be reduced to elemental sulphur by suitable high temperature treatment with reducing agents, such as carbonaceous fuels in the nature of coke, liquids in the nature of petroleum or gases in the nature of natural gas, producer gas or water gas. When it is desired to carry out this reaction, making use of roaster gases as the source of sulphur dioxide, the dilute nature of the roaster gases and the consequent low content of sulphur dioxide tend to make the commercial practice impracticable. This is so principally from two causes; one is the immense volume of gases which must be heated to a high temperature; the other is the difficulty of separating the comparatively small amount of solid sulphur from such a large volume of gas.

I have discovered that the gases, given off from the roasting of such materials as ores in the nature of iron pyrites or other suitable minerals or compounds, may be enriched in sulphur dioxide to such an extent that the subsequent reduction to elemental sulphur and the recovery of the reduced sulphur is entirely practical. This enrichment of the roaster gases I accomplish by the removal of the remaining oxygen in roaster gases by means of sulphur which is added thereto, the oxygen and sulphur, at the temperature of the fresh roaster gases, combining to form sulphur dioxide.

In the practice of the invention the amount of carbon or other reducing agent required to burn out this oxygen at this stage is exactly the same as that required to reduce the sulphur dioxide which is formed in this process at this stage. The advantage of burning out the oxygen with sulphur prior to the reduction is that in the former case the gas which goes to the reducing chamber is low in sulphur dioxide, and consequently, there is more difficulty both in the reduction and in the collection of sulphur later in the process, as compared to a gas going to the reduction chamber which contains a higher percentage of sulphur dioxide.

In the roasting of sulphur-bearing materials such as mineral sulphide ores in order to oxidize the largest possible amount of the contained sulphur, it is advantageous to pass an excess of air through the retort or furnace; thus, the combustion operation is maintained at a high rate and a more thorough burning of the sulphur-bearing material is obtained. This gain in efficiency in the roasting process entails a corresponding loss in subsequent reduction and condensation steps, provided it is desired to reduce the roaster gases and recover the reduced sulphur. In the practice of the present invention, the high efficiency of the roasting process making use of an excess of air is maintained. At the same time by the burning of sulphur in these roaster gases, which carry an excess of air or oxygen, the gases which are sent to the reduction process are rich in sulphur dioxide and low in oxygen, and as a consequence the gases exiting from the reduction chamber carry high percentages of elemental sulphur vapor and a minimum of inert gases. This permits the condensation of the sulphur to be carried out most easily and efficiently. Thus, by means of the present invention, all stages of the process are benefited, and this is accomplished without a loss of either sulphur or reducing agent.

Various forms of apparatus are available for the practice of the invention. In the single figure of the accompanying drawing, I have illustrated an apparatus satisfactory for the purpose.

The apparatus illustrated in the drawing comprises an inclined, cylindrical retort 5 rotatably mounted. The retort may be made of any appropriate material adapted to withstand such corrosive influences as result from the reactions taking place between the sulphur-bearing material and the oxygen of the air.

The retort may be enclosed for the greater part of its length in a furnace structure 7, having an opening 8 communicating with a grate or fire box (not shown) and a stack 9. The upper or charging end of the retort is operatively connected to the feeding hopper 10 which is adapted to feed the sulphur-bearing material into the revolving retort. A residue discharge spout 11 is associated with the lower end of the retort and is adapted to remove the residues discharging from the retort. Appropriate sealing agencies may be provided in conjunction with the feeding hopper and the discharge spout.

The outlet passage 12 at the upper end of the retort is operatively connected with the sulphur burner 13. The pipe 14 connects the sulphur burner with the reduction furnace or chamber 15.

The reduction chamber is supplied with reducing material in any appropriate manner. Coal or coke may be admitted for this purpose from the hopper 16, through the valved pipe 17. The reduced gases are withdrawn from the reducing chamber 15 through the opening 18, which is operatively connected to the condenser 19 by the passageway 20.

In the condenser 19 are cooling coils 21 and 22 and the condenser is preferably divided into two portions by a baffle wall 23. Suitable valved sulphur withdrawing passages 24 are provided in the condenser compartment bottoms and a valved gas exit passage 25 is provided for the release of the spent gases from the processes.

The operation of the apparatus will be understood from the foregoing description. Sulphur-bearing material in the nature of pyrites is fed into the retort 5 through the hopper 10. Air to support the combustion is admitted through the opening 26 and the spent cinder or ash is withdrawn from the lower end of the retort through the withdrawal spout 11. During the operation of the retort external heat may be provided through the medium of the furnace structure 7.

The gases passing out of the upper end of the retort through the passage 12 pass directly into a sulphur burner 13 where the excess oxygen in the roaster gases is converted into sulphur dioxide. The sulphur dioxide enriched gases pass from the sulphur burner through the passageway 14 into the reduction furnace or chamber 15 where they are reduced by the hot reducing material contained in the furnace.

The reduced gases and vapors pass out of the top of the reduction chamber through the opening 18 and are conveyed through the passage 20 to the condenser 19. The vapors in their passage through the condenser 19 pass up and over the baffle wall 23 and thus are brought successively in contact with the cooling coils 22 and 21, and in that manner are gradually cooled, since the cooling liquid passes successively from coil 21 to coil 22.

The condensed sulphur falls to the bottom of the condenser where it is intermittently withdrawn through the valved passages 24. The spent gases are permitted to escape through the passage 25.

While certain forms of apparatus have been illustrated, it will be understood that these may be changed or varied at will without in any way departing from the spirit of the invention. The use of a liquid hydrocarbon or gaseous reducing agent in place of the solid carbonaceous fuel would necessitate a different type of reduction chamber. The type of condenser may be changed to suit any operating condition which may be made. The oxidizing retort might be altered or changed to better handle a given type of sulphur-bearing material. The sulphur burner may be of any desired type, either rotary or cascade. In place of a tubular retort which showers the pyrites through the gaseous stream, a retort with mechanical arms to keep the pyrites stirred up in contact with the gaseous stream may be used.

I claim:

1. The method of treating mineral sulphide ores for the recovery of their sulphur content which comprises roasting the ores at an elevated temperature in the presence of an excess of air adapted to form roaster gases containing sulphur dioxide, and then burning sulphur in the presence of the roaster gases in amount adapted materially to enrich the gases in sulphur dioxide content.

2. The method of producing a mixture of gases containing sulphur dioxide which comprises oxidizing metal sulphide-bearing material to produce a mixture of gases containing sulphur dioxide and oxygen, and subjecting the resulting mixture of gases to the action of elemental sulphur at a temperature sufficiently elevated to cause oxygen contained therein to combine with the sulphur to form additional sulphur dioxide.

3. The method of producing a mixture of gases containing sulphur dioxide which comprises heating metal sulphide-bearing material in the presence of air to produce a hot mixture of gases containing sulphur dioxide and oxygen, and subjecting the resulting hot gases to the action of elemental sulphur to form additional sulphur dioxide.

4. The method of recovering sulphur which comprises oxidizing metal sulphide-bearing material to produce a mixture of gases containing sulphur dioxide and oxygen, passing the mixture of gases in contact with elemental sulphur at a temperature sufficiently elevated to cause oxygen contained therein to combine with the sulphur to form additional quantities of sulphur dioxide, and reacting the resulting gases with a reducing agent to recover elemental sulphur.

5. The method of recovering sulphur which comprises roasting metal sulphide-bearing material to produce a mixture of hot gases containing sulphur dioxide and oxygen, subjecting the hot gases to the action of elemental sulphur to produce additional quantities of sulphur dioxide, and subjecting the sulphur dioxide of the resulting gases to the action of a reducing agent to produce elemental sulphur.

In testimony whereof I affix my signature.

RAYMOND F. BACON.